United States Patent
Li et al.

(10) Patent No.: US 11,539,071 B2
(45) Date of Patent: *Dec. 27, 2022

(54) SULFIDE-IMPREGNATED SOLID-STATE BATTERY

(71) Applicant: GM Global Technology Operations LLC, Detroit, MI (US)

(72) Inventors: Zhe Li, Shanghai (CN); Xiaochao Que, Shanghai (CN); Haijing Liu, Shanghai (CN); Yong Lu, Shanghai (CN); Mark W. Verbrugge, Troy, MI (US); Meiyuan Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 494 days.

This patent is subject to a terminal disclaimer.

(21) Appl. No.: 16/578,880

(22) Filed: Sep. 23, 2019

(65) Prior Publication Data
US 2021/0036360 A1   Feb. 4, 2021

(30) Foreign Application Priority Data
Jul. 29, 2019 (CN) .......................... 201910688212.6

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0071* (2013.01)

(58) Field of Classification Search
CPC ......... H01M 10/0562; H01M 10/0525; H01M 2300/0071
See application file for complete search history.

(56) References Cited

U.S. PATENT DOCUMENTS

2020/0350633 A1\* 11/2020 Busacca ................ H01M 50/46

\* cited by examiner

*Primary Examiner* — Osei K Amponsah
(74) *Attorney, Agent, or Firm* — Vivacqua Crane PLLC

(57) ABSTRACT

A sulfide-impregnated solid-state battery is provided. The battery comprises a cell core constructed by basic cell units. Each unit comprises a positive electrode comprising a cathode layer and a positive meshed current collector comprising a conductive material which is further coated by oxide-based solid-state electrolyte. The cell unit further comprises a negative electrode comprising an anode layer and a negative meshed current collector comprising a conductive material which is further coated by oxide-based solid-state electrolyte. The positive and negative electrodes are stacked together to form the cell unit. The two coated oxide-based solid electrolyte layers are disposed between the positive and negative electrode as dual separators. Such a cell unit may be repeated or connected in parallel or bipolar stacking to form the cell core to achieve a desired battery voltage, power and energy. The cell core comprises a sulfide-based solid-state electrolyte dispersed in the pore structures of cell core.

14 Claims, 8 Drawing Sheets

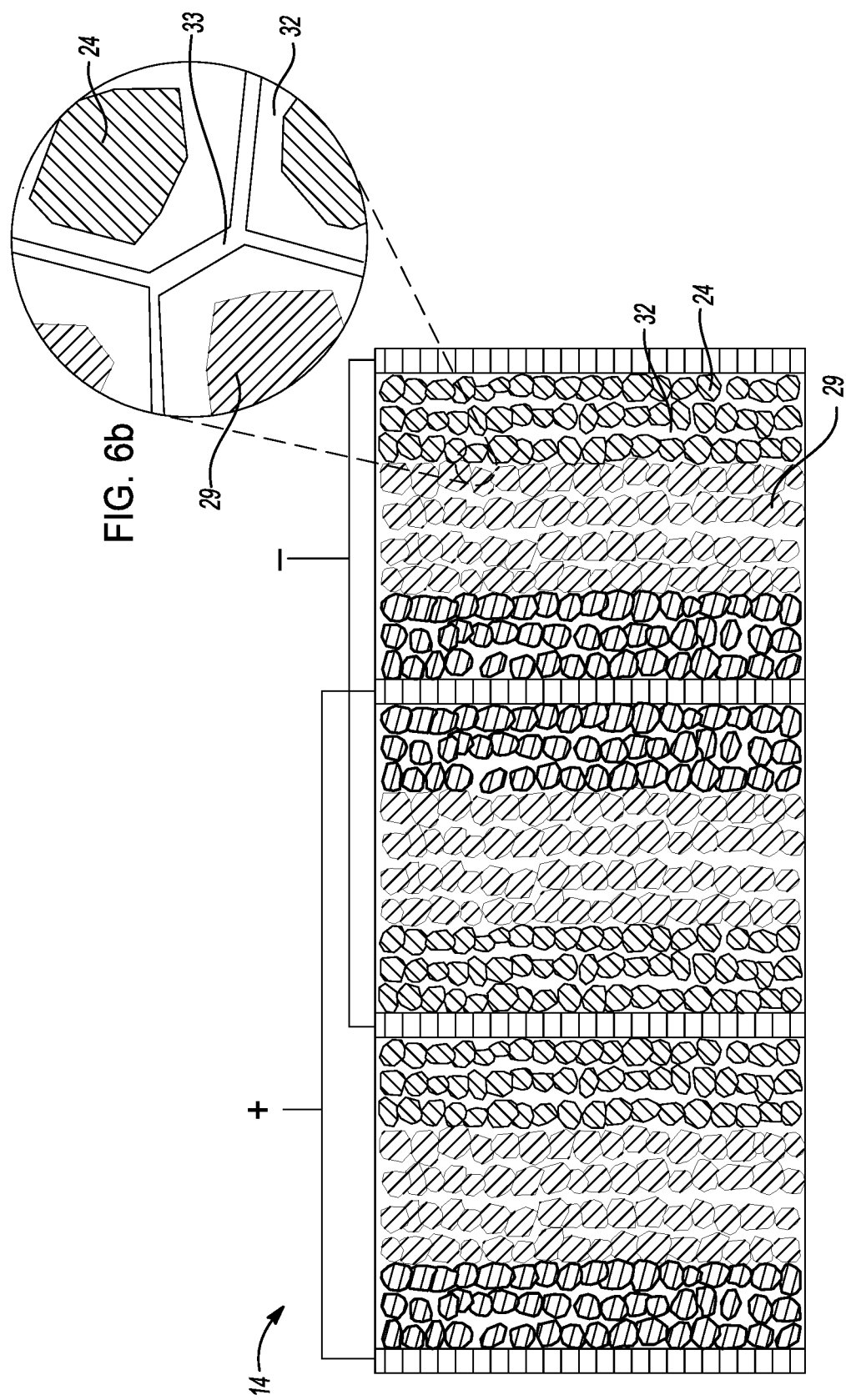

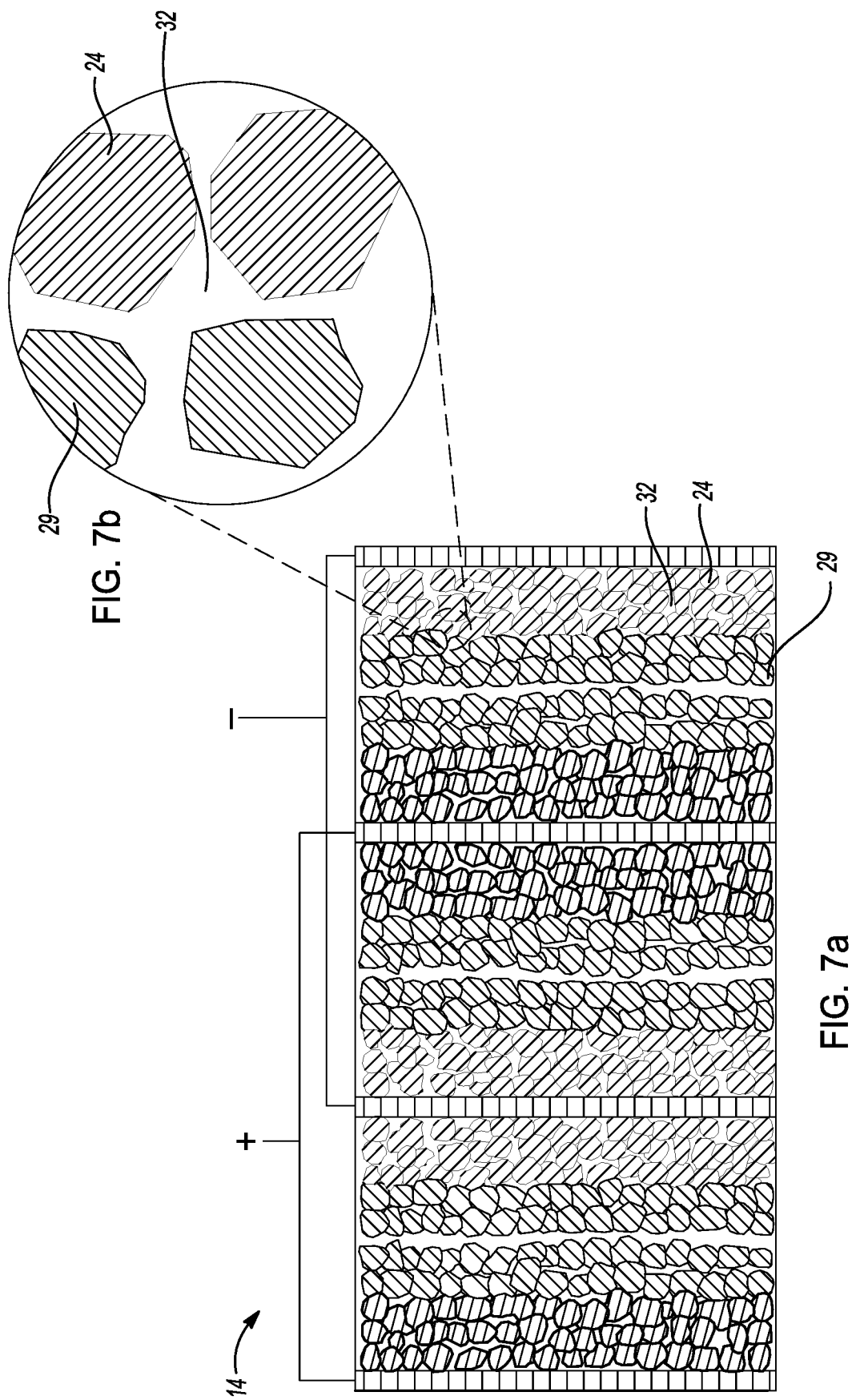

SULFIDE-IMPREGNATED SOLID-STATE BATTERY

INTRODUCTION

The present disclosure relates to rechargeable solid-state batteries and, more particularly, sulfide-impregnated solid-state battery designs.

With the rapid popularization of information-related devices, communication devices, and so on, the importance of developing batteries that can be used as power supplies for these devices has grown. Moreover, in the automobile industry, the development of high-power-output, large-energy-density batteries that can be used in electric automobiles or hybrid automobiles is progressing. Among the various types of batteries that currently exist, lithium-ion batteries are one focus of attention due to a favorable power density (fast charging/discharging performance), a high energy density, a long cycle life, and an ability to be formed into a wide variety of shapes and sizes so as to efficiently fill available space in electric vehicles, cellular phones, and other electronic devices. However, those commercialized lithium-ion batteries are generally employing flammable organic liquid electrolyte which may result in undesirable risks.

Driven by enhancing the battery safety, organic liquid electrolytes have been considered to be replaced by non-flammable solid-state electrolyte (SSE), which can also endow lithium-ion batteries with wide working temperature range, high energy density, simple cell packaging and so on. Among various SSEs, sulfide-based solid-state electrolyte (S-SSE) has attracted increasing attention due to its high conductivity, soft mechanical strength and great potential to be an enabling material for high-power-type solid-state battery (SSB). Although many advances have been achieved in sulfide-based solid-state battery (S-SSB), challenges in S-SSB fundamental science, manufacturing and large-scale production still exist.

For example, in current S-SSB, sulfide-based electrode is prepared by wet coating the mixture of active materials, S-SSE, binder, and/or carbon additives onto flat current collector. Within the electrode, the distribution of active materials and S-SSE is typically relatively inhomogeneous with improvable electrode-electrolyte interface. As a result, to build up sufficient ionic contacts, a relatively large amount of S-SSE is typically added into the electrode, decreasing the battery energy density. Another issue is related to high sensitivity of S-SSE to moisture, where S-SSE will react with $H_2O$ molecules and may generate undesirable $H_2S$ gas. In this regard, ambient atmosphere is typically tightly controlled in each step of current S-SSB manufacturing (e.g., wet-coating process) which may increase manufacturing cost. Moreover, the selections of solvent, binder and their combination are relatively limited, leading to an increased engineering cost.

SUMMARY

The present disclosure provides battery cell designs and method of making batteries such as sulfide-impregnated solid-state batteries. Such cell designs are featured by uniformly distributed sulfide-based solid-state electrolyte (S-SSE) in pore spaces of a tailor-made cell core, which not only enable an intimate electrode-electrolyte interface, but also bring down the S-SSE content in electrodes while boosting the power capability of a solid-state battery (SSB). In the method of making those batteries, S-SSE is involved from being dissolved into solvent to form the precursor solution, followed by its impregnation into as-formed cell core. The moisture content in environment do not need to tightly control because the S-SSE dissolved in solvent could not directly contact with the moister in environmental.

The cell design starts from a tailor-made cell core that is constructed by basic cell units. Each cell unit has a positive electrode having a cathode layer and a meshed positive current collector. The cathode layer is further coated by an oxide-based solid electrolyte layer. Each cell unit further includes a negative electrode comprising anode layer and a meshed negative current collector. The anode layer is further coated by an oxide-based solid electrolyte layer. The positive and negative electrodes are stacked together, and two of the coated oxide-based solid electrolyte layers are disposed between the positive and negative electrode as dual separators. Such basic cell unit may be repeated or connected in parallel or in series (namely, bipolar stacking) to form the cell core to achieve a desired battery voltage, power and energy. The cell core is further partially sealed into the packaging such as the Al laminated film and metal can.

In this embodiment, the cathode layer comprises between about 30 wt % and about 98 wt % cathode active material, between about 0 wt % and about 30 wt % conductive additive, and between about 0 wt % and about 20 wt % binder. Moreover, the anode layer comprises between about 30 wt % and about 98 wt % anode active material, between about 0 wt % and about 30 wt % conductive additive, and between about 0 wt % and about 20 wt % binder.

The cell core is then introduced by a sulfide-based solid-state electrolyte (S-SSE) precursor solution. The S-SSE precursor solution comprises a sulfide-based solid-state electrolyte and a solvent. Note that the meshed positive/negative current collectors are designed to improve the wettability of the S-SSE precursor solution. The solvent is then evaporated from the cell core to dry the cell core and solidify the sulfide-based solid-state electrolyte within the cell core. Furthermore, the cell core is pressed to densify the sulfide-base solid-state electrolyte within the cell core, followed by fully sealing the cell core. As a result, sulfide-based solid-state electrolyte (S-SSE) can be uniformly distributed in pore spaces of the cell core.

In one example, the S-SSE precursor solution comprises a $Li_6PS_5Cl$-ethanol solution. In another example, the S-SSE precursor solution comprises at least one of a pseudobinary sulfide with solvent, a pseudoternary sulfide with solvent, and a pseudoquaternary sulfide with solvent. In this aspect, the pseudobinary sulfide comprises one of $Li_3PS_4$, $Li_7P_3S_{11}$, $Li_4SnS_4$, and $80Li_2S.20P_2S_5$. The pseudoternary sulfide may comprise one of $Li_{3.25}Ge_{0.25}P_{0.75}S_4$, $Li_6PS_5Br$, $Li_6PS_5Cl$, $Li_7P_2S_8I$, $Li_4PS_4I$, and $LiI-Li_4SnS_4$. Further, the pseudoquaternary sulfide may comprise one of $Li_{9.54}Si_{1.74}P_{1.44}S_{11.7}Cl_{0.3}$ and $Li_{10.35}[Sn_{0.27}Si_{1.08}]P_{1.65}S_{12}$. In those examples, the solvent may comprise at least one of a tetrahydrofuran, ethyl propionate, ethylacetate, acetonitrile, water, N-methyl formamide, methanol, ethanol, ethanol-tetrahydrofuran co-solvent, and 1,2-dimethoxyethane. In another example, the S-SSE precursor solution comprises $Li_{10}GeP_2S_{12}$, a polyethylene oxide and an acetonitrile solvent. In some examples, to improve the S-SSE dispersibility, some dispersant (such as Triton X-100) are further added into S-SSE precursor solution.

According to another aspect, a sulfide-impregnated solid-state battery design is provided. The battery comprises a cell core that is constructed by basic cell units. Each cell unit has a positive electrode comprising a cathode layer and a positive meshed current collector comprising a conductive material. The cathode layer is further coated by oxide-based solid electrolyte layer. Each cell unit further includes a negative electrode comprising anode layer and a negative meshed current collector comprising a conductive material. The anode layer is further coated by oxide-based solid electrolyte layer. The positive and negative electrodes are stacked together and two of the coated oxide-based solid electrolyte layers are disposed between the positive and negative electrodes as dual separators. Note that the coated oxide-based solid electrolyte layers onto cathode/anode layers are designed to build up more lithium-ion conduction pathways. Such basic cell unit may be repeated or connected in parallel or in series (namely, bipolar stacking) to form the cell core to achieve a desired battery voltage, power and energy. Furthermore, the cell core comprises a densified sulfide-based solid-state electrolyte dispersed in the pore structures of cell core.

In this example, the cathode layer comprises between about 30 wt % and about 98 wt % cathode active material, between about 0 wt % and about 50 wt % sulfide-based solid-state electrolyte, between about 0 wt % and about 30 wt % conductive additive, and between about 0 wt % and about 20 wt % binder. Moreover, the anode layer may comprise between about 30 wt % and about 98 wt % anode active material, between about 0 wt % and about 50 wt % sulfide-based solid-state electrolyte, between about 0 wt % and about 30 wt % conductive additive, and between about 0 wt % and about 20 wt % binder. Moreover, each of the cathode layer and the anode layer has a thickness of between about 1 micrometer and about 1000 micrometers.

In another example, each of the positive meshed current collector and the negative meshed current collector has a thickness of between about 4 micrometers and about 200 micrometers. Moreover, each of the positive meshed current collector and the negative meshed current collector has a pore size of between about 50 nm and 2000 um. The conductive material of meshed current collector may comprise aluminum, nickel, iron, titanium, copper, tin, and alloys thereof.

In yet another aspect, the positive meshed current collectors and the negative meshed current collectors could partially/entirely replaced be flat foils of conductive material with no meshes (holes).

In another example, to build up more lithium-ion conduction pathways within the electrodes, oxide-based solid electrolyte particles (such as Li3xLa2/3-xTiO3, Li1.4Al0.4Ti1.6(PO4)3 and Li1+xAlxGe2-x(PO4)3), Li2+2xZn1-x GeO4, Li7La3Zr2O12) could also be incorporated in cathode layer, anode layer or both. The cathode layer may comprise between about 30 wt % and about 98 wt % cathode active material, between about 0 wt % and about 30 wt % oxide-based solid-state electrolyte, between about 0 wt % and about 50 wt % sulfide-based solid-state electrolyte, between about 0 wt % and about 30 wt % conductive additive, and between about 0 wt % and about 20 wt % binder. Moreover, the anode layer may comprise between about 30 wt % and about 98 wt % anode active material, between about 0 wt % and about 30 wt % oxide-based solid-state electrolyte, between about 0 wt % and about 50 wt % sulfide-based solid-state electrolyte, between about 0 wt % and about 30 wt % conductive additive, and between about 0 wt % and about 20 wt % binder.

In this embodiment, the sulfide-based solid electrolyte comprises at least one of a pseudobinary sulfide, a pseudoternary sulfide, and a pseudoquaternary sulfide. The pseudobinary sulfide may comprise one of $Li_3PS_4$, $Li_7P_3S_{11}$, $Li_4SnS_4$, and $80Li_2S.20P_2S_5$. The pseudoternary sulfide may one of $Li_{3.25}Ge_{0.25}P_{0.75}S_4$, $Li_6PS_5Br$, $Li_6PS_5Cl$, $Li_7P_2S_8I$, $Li_4PS_4I$, and $LiI$—$Li_4SnS_4$. The pseudoquaternary sulfide may comprise one of $Li_{9.54}Si_{1.74}P_{1.44}S_{11.7}Cl_{0.3}$ and $Li_{10.35}[Sn_{0.27}Si_{1.08}]P_{1.65}S_{12}$.

In yet another aspect, the coated separator layers (oxide-based solid-state electrolyte layer) onto electrodes comprises at least one of a $Li_{3x}La_{2/3-x}TiO_3$, $Li_{1.4}Al_{0.4}Ti_{1.6}(PO_4)_3$ and $Li_{1+x}Al_xGe_{2-x}(PO_4)_3$), $Li_{2+2x}Zn_{1-x}GeO_4$, $Li_7La_3Zr_2O_{12}$ or mixtures thereof. The coated separator layers (oxide-based solid-state electrolyte layer) has a thickness of between about 50 nanometers and about 1000 micrometers. Moreover, the coated separator layers may comprise at least one of an oxide-based solid-state electrolyte, a metal-doped and aliovalent-substituted oxide-based solid-state electrolyte. In another aspect, the coated separator comprises one of a borate or phosphate solid-state electrolyte. In yet another example, the coated separator layer comprises one of a dry air-stable solid electrolyte and an oxide ceramic powder.

According to another aspect, a sulfide-impregnated solid-state battery design is provided. The battery comprises a cell core that is constructed by basic cell units. Each cell unit has a positive electrode comprising a cathode layer and a positive meshed current collector comprising a conductive material. Each cell unit further includes a negative electrode comprising anode layer and a negative meshed current collector comprising a conductive material. The anode layer is further coated by oxide-based solid electrolyte layer. The positive and negative electrodes are stacked together and the coated oxide-based solid electrolyte layer on the anode layer surface is disposed between the positive and negative electrodes as a single separator. Note that the coated oxide-based solid electrolyte layer onto anode layer is designed to build up more lithium-ion conduction pathways. Such basic cell unit may be repeated or connected in parallel or in series (namely, bipolar stacking) to form the cell core to achieve a desired battery voltage, power and energy. Furthermore, the cell core comprises a densified sulfide-based solid-state electrolyte dispersed in the pore structures of cell core.

According to another aspect, a sulfide-impregnated solid-state battery design is provided. The battery comprises a cell core that is constructed by basic cell units. Each cell unit has a positive electrode comprising a cathode layer and a positive meshed current collector comprising a conductive material. The cathode layer is further coated by oxide-based solid electrolyte layer. Each cell unit further includes a negative electrode comprising anode layer and a negative meshed current collector comprising a conductive material. The positive and negative electrodes are stacked together and the coated oxide-based solid electrolyte layer on the cathode layer surface is disposed between the positive and negative electrodes as a single separator. Note that the coated oxide-based solid electrolyte layer onto cathode layer is designed to build up more lithium-ion conduction pathways. Such basic cell unit may be repeated or connected in parallel or in series (namely, bipolar stacking) to form the cell core to achieve a desired battery voltage, power and energy. Furthermore, the cell core comprises a densified sulfide-based solid-state electrolyte dispersed in the pore structures of cell core.

In accordance with yet another aspect, a method of making a sulfide-impregnated solid-state battery design is provided. The method comprises providing a cell core that is constructed by basic cell units. Each cell unit has a positive electrode comprising a cathode layer and a positive meshed current collector. In this example, the cathode layer comprises between about 30 wt % and about 98 wt % cathode active material, between about 0 wt % and about 30 wt % conductive additive, and between about 0 wt % and about 20 wt % binder. Each cell unit further comprises a negative electrode comprising anode layer and a negative meshed current collector. Moreover, the anode layer comprises between about 30 wt % and about 98 wt % anode active material, between about 0 wt % and about 30 wt % conductive additive, and between about 0 wt % and about 20 wt % binder.

In this aspect, the cathode layer and anode layer are further coated by oxide-based solid electrolyte layers, respectively, followed by stacking them together. The two of oxide-based solid electrolyte layers are then disposed between the positive and negative electrode as dual separators. Such basic cell unit may be repeated or connected in parallel or in series (namely, bipolar stacking) to form the cell core to achieve a desired battery voltage, power and energy. The cell core is further partially sealed into the packaging such as the Al laminated film and metal can.

The method further comprises introducing a sulfide solid-state electrolyte (S-SSE) precursor solution in the cell core. The S-SSE precursor solution comprises a sulfide solid electrolyte and a solvent. In this example, the sulfide solid electrolyte comprises at least one of a pseudobinary sulfide, a pseudoternary sulfide, and a pseudoquaternary sulfide. The pseudobinary sulfide may comprise one of $Li_3PS_4$, $Li_7P_3S_{11}$, $Li_4SnS_4$, and $80Li_2S \cdot 20P_2S_5$. Moreover, the pseudoternary sulfide may comprise one of $Li_{3.25}Ge_{0.25}P_{0.75}S_4$, $Li_6PS_5Br$, $Li_6PS_5Cl$, $Li_7P_2S_8I$, $Li_4PS_4I$, and $LiI—Li_4SnS_4$. In this aspect, the pseudoquaternary sulfide comprises one of $Li_{9.54}Si_{1.74}P_{1.44}S_{11.7}Cl_{0.3}$ and $Li_{10.35}[Sn_{0.27}Si_{1.08}]P_{1.65}S_{12}$. In this example, the solvent may comprise at least one of a tetrahydrofuran, ethyl propionate, ethylacetate, acetonitrile, water, N-methyl formamide, methanol, ethanol, ethanol-tetrahydrofuran co-solvent, and 1,2-dimethoxyethane.

The method further comprises evaporating the solvent from the cell core between about 60 C and about 600 C under vacuum for about 30 minutes to about 120 hours to dry the cell core and solidify the sulfide-based solid-state electrolyte within the cell core. The method further comprises pressurizing the cell core between about 2 MPa and about 800 MPa at about 10 C to about 300 C for about 2 minutes to about 12 hours to densify the sulfide-base solid-state electrolyte within the cell core. The cell core is then fully sealed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4a is a cross-sectional view of a conceptual image of the cell core after the step of introducing in FIG. 3.

FIG. 4b is an exploded cross-sectional view of a conceptual image of the cell core of FIG. 4a.

FIG. 6a is a cross-sectional view of a conceptual image of the cell core after the step of evaporating in FIG. 5.

FIG. 6b is an exploded cross-sectional view of a conceptual image of the cell core of FIG. 6a.

FIG. 7a is a cross-sectional view of a conceptual image of the cell core of FIG. 6a after a densification step.

FIG. 7b is an exploded cross-sectional view of a conceptual image of the cell core of FIG. 7a.

DETAILED DESCRIPTION

The following description is merely exemplary in nature and is not intended to limit the present disclosure, application, or uses.

Figure 1:
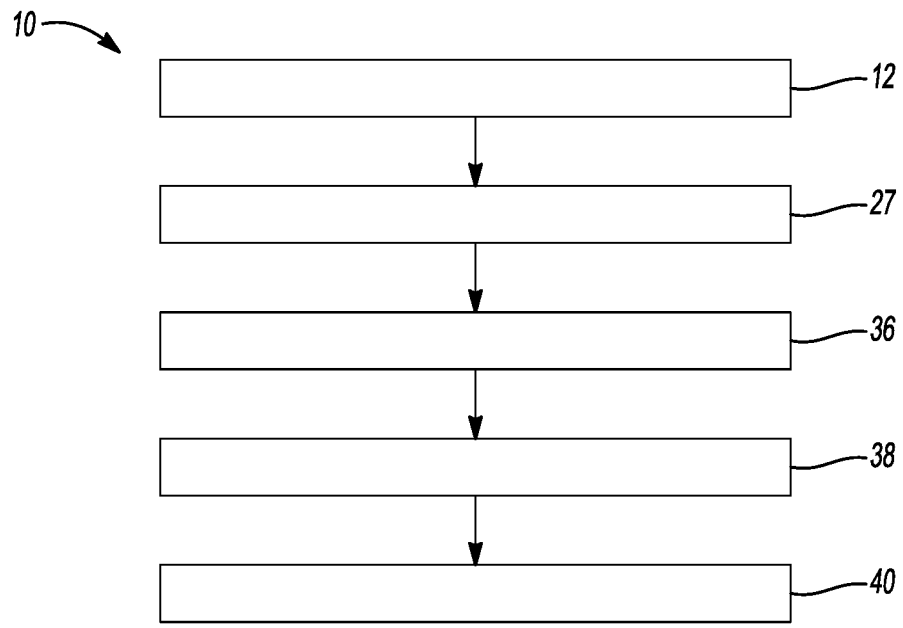
FIG. 1 is a flowchart depicting a method of preparing a sulfide-impregnated solid-state battery in accordance with one example of the disclosure.
Figure 2:
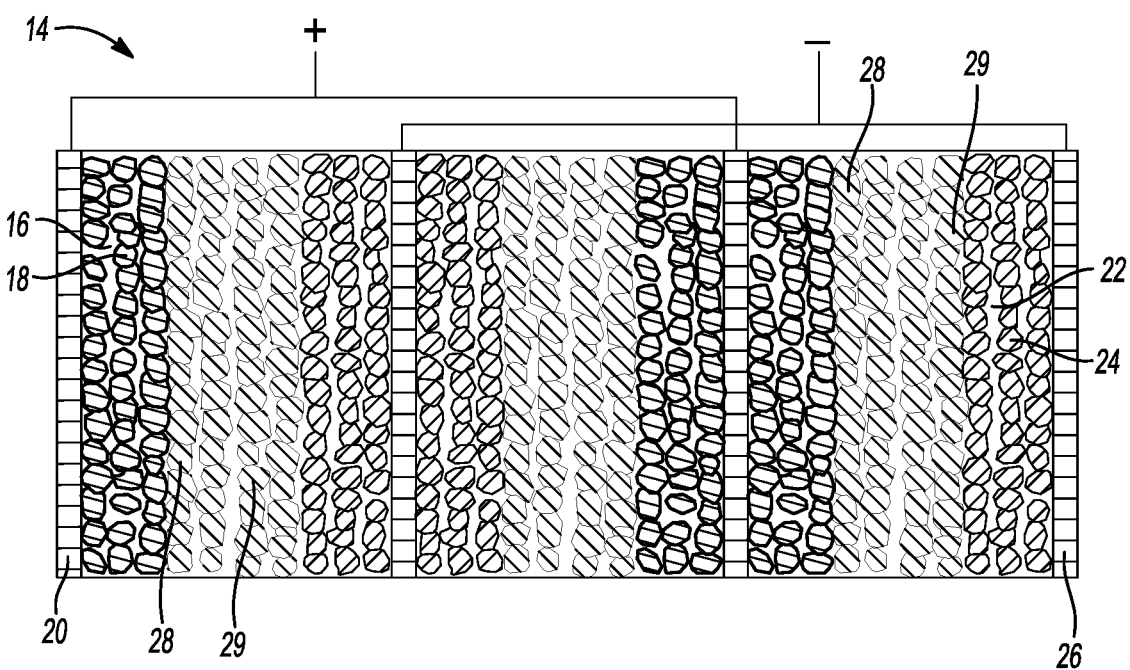
FIG. 2 is a cross-sectional view of a conceptual image of a parallel-connected cell core provided to prepare a sulfide-impregnated solid-state battery of FIG. 1.
Figure 3:
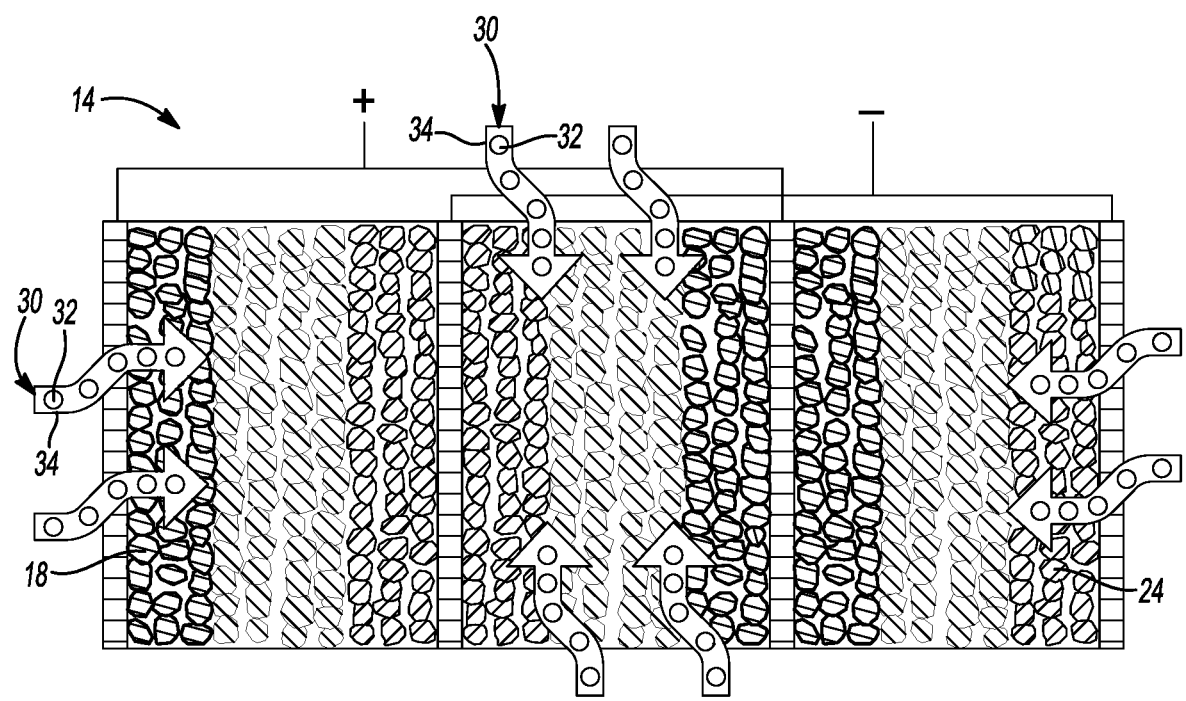
FIG. 3 is a cross-sectional view of a conceptual image of introducing a sulfide solid-state electrolyte precursor solution in the cell core of FIG. 1.
Figure 4:
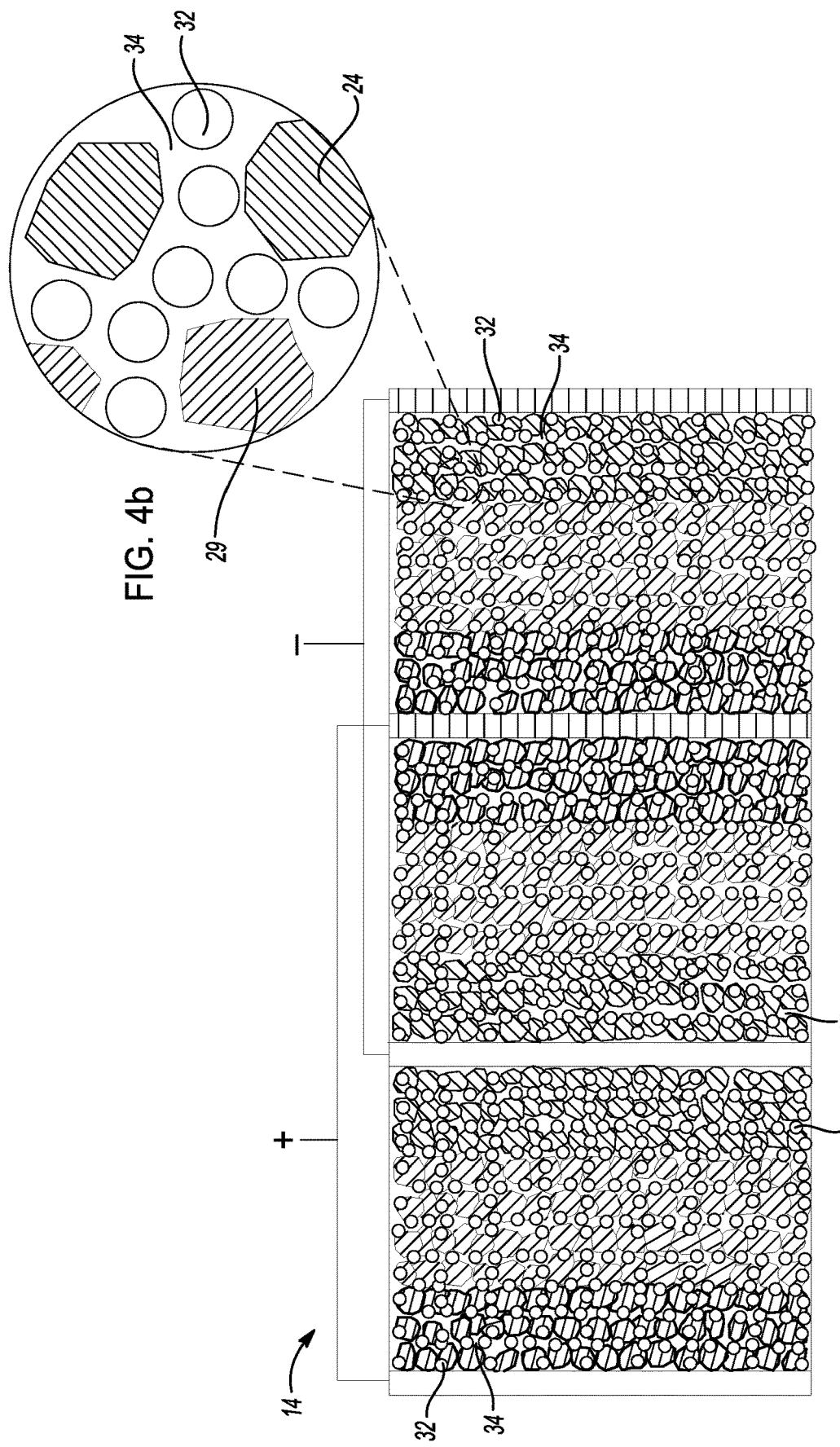

Referring to FIGS. 1-2, a method 10 of making a sulfide-impregnated solid-state battery is provided. As shown, method 10 comprises a step 12 of providing a cell core for a rechargeable battery. In this example, a cell core with a plurality of cell units in parallel connection is provided. As shown in FIG. 2, the plurality of cell units are arranged in a parallel-connected stacking design. However, it is understood that the cell units may be arranged in any other suitable manner. For example, the cell units may be connected in series, that is bipolar stacking design.

As shown in FIG. 2, cell core 14 is constructed by basic cell units that are in a parallel-connected stacking design. Each cell unit has a positive electrode 16 having a cathode layer 18 and a positive meshed current collector 20. The cathode layer 18 is further coated by an oxide-based solid electrolyte layer 28. Preferably, cathode layer 18 comprises between about 30 wt % and about 98 wt % cathode active material, between about 0 wt % and about 30 wt % conductive additive, and between about 0 wt % and about 20 wt % binder. In this embodiment, the cathode active material may comprise any suitable material such as a high-voltage oxide, a surface-coated high-voltage cathode material, a doped high-voltage cathode material, a rock salt layered oxide, a spinel, a polyanion cathode, a lithium transition-metal oxide, or mixtures thereof. In one embodiment, the cathode active material comprises $LiNi_{0.5}Mn_{1.5}O_4$, $LiNbO_3$-coated $LiNi_{0.5}Mn_{1.5}O_4$, $LiCoO_2$, $LiNi_xMn_yCo_{1-x-y}O_2$, $LiNi_xMn_{1-x}O_2$, $Li_{1+x}MO_2$, $LiMn_2O_4$, $LiV_2(PO_4)_3$, or mixtures thereof.

In one embodiment, the conductive additive of the cathode layer may comprise any suitable material such as carbon black, graphite, graphene, graphene oxide, Super P, acetylene black, carbon nanofibers, carbon nanotubes and other electronically conductive additives. Moreover, the binder of the cathode layer may comprise poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS).

Moreover, cathode layer 18 may have a thickness of between about 1 micrometer and about 1000 micrometers. In this embodiment, the positive meshed current collector 20 comprises a conductive material and has a thickness of between about 4 micrometers and about 200 micrometers. The conductive material may comprise aluminum, nickel, iron, titanium, copper, tin, and alloys thereof. Moreover, the meshed current collector has a pore size of between about 50 nm and 2000 um. In yet another aspect, all/part of the positive meshed current collectors could also be replaced by the flat foils of conductive material with no meshes (holes).

As shown in FIG. 2, each cell unit in cell core 14 has a negative electrode 22 comprising an anode layer 24 and a negative meshed current collector 26. The anode layer 24 is further coated by an oxide-based solid electrolyte layer 29 In this embodiment, anode layer 24 preferably comprises between about 30 wt % and about 98 wt % anode active material, between about 0 wt % and about 30 wt % conductive additive, and between about 0 wt % and about 20 wt % binder. Moreover, anode layer 24 may have a thickness of between about 1 micrometer and about 1000 micrometers.

In this embodiment, the anode active material may comprise carbonaceous material (for example, graphite, hard carbon, and soft carbon), silicon, silicon-graphite mixture, $Li_4Ti_5O_{12}$, transition-metal (for example, Sn), metal oxide or sulfide (for example, $TiO_2$, FeS), and other lithium-accepting anode materials.

In one embodiment, the conductive additive of the anode layer may comprise any suitable material such as carbon black, graphite, graphene, graphene oxide, Super P, acetylene black, carbon nanofibers, carbon nanotubes and other electronically conductive additives. Moreover, the binder of the anode layer may comprise poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS).

Preferably, the negative meshed current collector has a thickness of between about 4 micrometers and about 200 micrometers. Moreover, the negative meshed current collector has a pore size of between about 50 nm and 2000 um. In yet another aspect, all/part of the negative meshed current collectors could also be replaced by the flat foils of conductive material with no meshes (holes).

The positive electrode 16 and the negative electrode 22 are staked in parallel and separated by a first coated separator layer 28 comprised of oxide-based solid electrolyte and a second coated separator layer 29 comprised of oxide-based solid electrolyte. As shown, first separator layer 28 is directly coated onto positive electrode 16 and second separator layer 29 is directly coated onto negative electrode layer 22. Preferably, the coated separator layer has a thickness of between about 50 nanometers and about 1000 micrometers.

In one embodiment, the coated separator layers 28,29 may comprise at least one of an oxide-based solid-state electrolyte, metal-doped and aliovalent-substituted oxide-based solid-state electrolytes. For example, the coated separator layer may comprise one of an $Li_7La_3Zr_2O_{12}$, aluminum-doped $Li_7La_3Zr_2O_{12}$, Sb-doped $Li_7La_3Zr_2O_{12}$ Ga-substituted $Li_7La_3Zr_2O_{12}$, a Cr and V-substituted $LiSn_2P_3O_{12}$, and an Al-substituted perovskite. In another embodiment, the coated separator layers may comprise one of a borate or phosphate solid-state electrolyte, e.g., $Li_2B_4O_7$, $Li_3PO_4$, LiPON ($Li_{2.88}PO_{3.73}N_{0.14}$) and $Li_2O$—$B_2O_3$—$P_2O$. In yet another example, the coated separator layers may comprise a dry air-stable solid-state electrolyte, e.g., $Li_{3.833}Sn_{0.833}As_{0.166}S_4$, LiI—$Li_4SnS_4$, and $Li_4SnS_4$. The coated separator layer may also comprise an oxide ceramic powder, e.g., $SiO_2$, $CeO_2$, $Al_2O_3$, $ZrO_2$.

In this embodiment, each of the current collectors have tabs extending from the top sides of electrodes. As shown in FIG. 2, The first and third current collectors (staring from left) 20 are electrically connected and indicated as positively charged as would be during discharge of a solid-state battery cell module. The second and fourth current collectors (staring from left) 26 are electrically connected and indicated as negatively charged. The cell core may be further partially sealed into the packaging such as the Al laminated film and metal can.

As shown in FIGS. 1, 3, and 4a-4b, the method 10 further comprises a step 27 of introducing a sulfide solid-state electrolyte (S-SSE) precursor solution 30 into the cell core 14. In this embodiment, the S-SSE precursor solution 30 comprises a sulfide-based solid-state electrolyte 32 and a solvent 34. Step 27 of introducing the S-SSE precursor solution into the cell core may be achieved in any suitable manner. For example, the S-SSE precursor solution may be injected in the cell core. Alternatively, the cell core may be dipped in S-SSE precursor solution to introduce the S-SSE precursor solution in the cell core.

Figure 5:
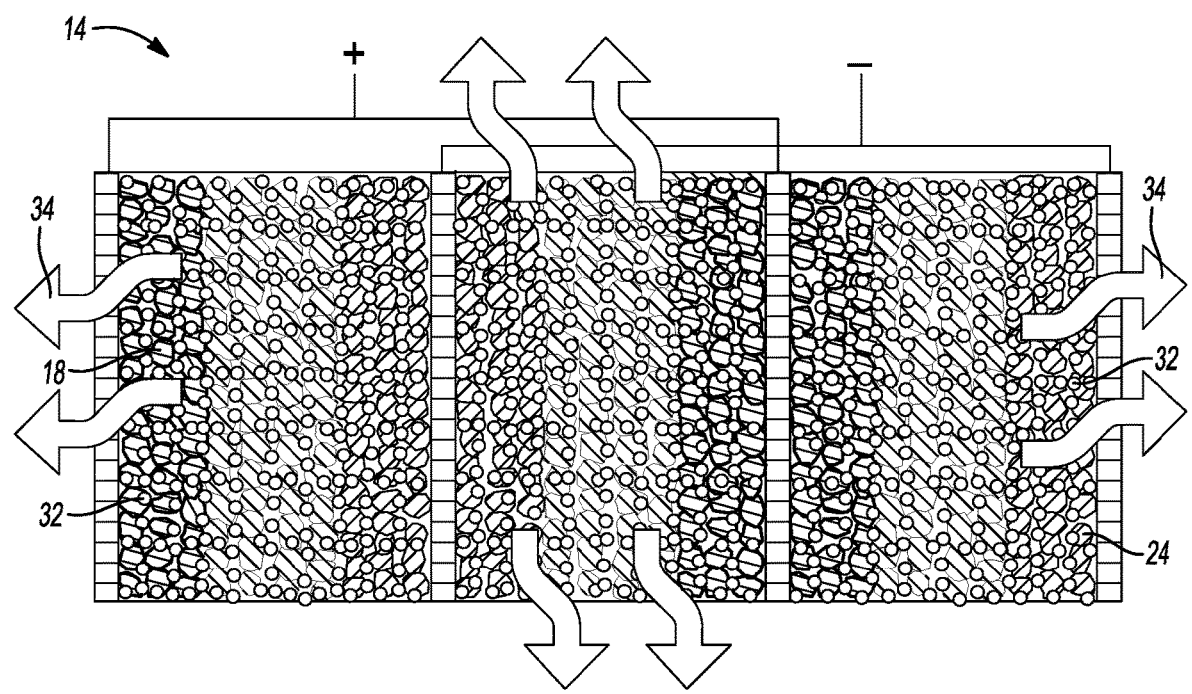
FIG. 5 is a cross-sectional view of a conceptual image of evaporating a solvent from the cell core of FIG. 1.

In one example, the S-SSE precursor solution comprises a $Li_6PS_5Cl$-ethanol solution. In another example, the S-SSE precursor solution comprises at least one of a pseudobinary sulfide with solvent, a pseudoternary sulfide with solvent, and a pseudoquaternary sulfide with solvent. In this aspect, the pseudobinary sulfide comprises one of $Li_3PS_4$, $Li_7P_3S_{11}$, $Li_4SnS_4$, and $80Li_2S.20P_2S_5$. The pseudoternary sulfide may comprise one of $Li_{3.25}Ge_{0.25}P_{0.75}S_4$, $Li_6PS_5Br$, $Li_6PS_5Cl$, $Li_7P_2S_8I$, $LI_4PS_4I$, and LiI—$Li_4SnS_4$. Further, the pseudoquaternary sulfide may comprise one of $Li_{9.54}Si_{1.74}P_{1.44}S_{11.7}Cl_{0.3}$ and $Li_{10.35}[Sn_{0.27}Si_{1.08}]P_{1.65}S_{12}$. In this example, the solvent may comprise at least one of a tetrahydrofuran, ethyl propionate, ethylacetate, acetonitrile, water, N-methyl formamide, methanol, ethanol, ethanol-tetrahydrofuran co-solvent and 1,2-dimethoxyethane. In another example, the S-SSE precursor solution comprises $Li_{10}GeP_2S_{12}$, a polyethylene oxide and an acetonitrile solvent. In some examples, to improve the S-SSE dispersibility, some dispersant (such as Triton X-100) are further added into S-SSE precursor solution As depicted in FIGS. 1 and 5, method 10 further comprises a step 36 of evaporating or drying solvent 34 from the cell core 14 to dry the cell core and solidify the sulfide-based solid-state electrolyte 32 within the pore structures of cell core 14. In this example, cell core 14 is heated between about 60 C and about 600 C under vacuum for about 30 minutes to about 120 hours. During heating, solvent 34 is evaporated from the cell core 14 as shown in FIG. 5. Preferably, the cell core 14 is heated at about 180 C under vacuum for about 3 hours, thereby evaporating solvent 34 from the cell core 14. Thus, during step 36, cell core 14 is dried and the sulfide-based solid-state electrolyte is solidified within the pore structures of cell core.

FIGS. 6a-6b depict cell core 14 after the step of evaporating the solvent therefrom as discussed above. As shown in FIG. 6a, cell core 14 comprises solidified sulfide-based solid-state electrolyte 32 (S-SSE) dispersed in the pore structures of cathode layer 18, anode layer 24, and coated separator layers 28, 29. That is, solidified sulfide-based solid-state electrolyte 32 may be coated onto the cathode electrode particles in cathode layer 18, anode electrode particles in anode layer 24 and solid-state electrolyte particles in coated separator layers 28, 29. FIG. 6b illustrates interfaces between S-SSE-coated anode active material particles in anode layer 24 and S-SSE-coated solid-state electrolyte particles in second coated separator layer 29. As shown, there may be some pore 33 in the cell core 14.

As depicted in FIG. 1, method 10 further comprises a step 38 of pressurizing 38 cell core 14 to densify the cell core thereby densifying the solid sulfide-base electrolyte within the cell core 14. In this example, step 38 of pressurizing comprises pressurizing cell core 14 between about 10 MPa and about 800 MPa for about 2 minutes to about 12 hours to densify the solid sulfide-base electrolyte within the cell core. In another example, the cell core is pressurized at greater than about 360 MPa.

FIGS. 7a-7b depict cell core 14 after step 38 of pressurizing thereby densifying sulfide-based solid-state electrolyte 32 as discussed above. As shown FIG. 7a, cell core 14 comprises densified sulfide-based solid-state electrolyte 32 dispersed in the pore structures of cathode layer 18, anode layer 24, and coated separator layers 28, 29. FIG. 7b illustrates an interface between anode active material particles in anode layer 24, solid-state electrolyte particles in second coated separator layer 29, and densified sulfide-based solid-state electrolyte 32. As shown, there is no pores in the cell core 14.

Furthermore, method 10 further comprises a step 40 of fully sealing the cell core. In this example, cell core 14 may be fully sealed into any suitable manner. For example, the cell core may be fully sealed by way of vacuum seal thereby minimizing exposure to air. Thus, the cell core may be placed in an aluminum laminated bag, can or container, and followed by fully vacuum sealing.

FIG. 7a illustrates one embodiment of the sulfide-impregnated battery cell core of the present disclosure as a result of the steps described above. The sulfide-impregnated battery cell core 14 is constructed by cell units that are in a parallel-connected stacking. In this embodiment, the cathode layer comprises between about 30 wt % and about 98 wt % cathode active material, between about 0 wt % and about 50 wt % sulfide-based solid electrolyte, between about 0 wt % and about 30 wt % conductive additive, and between about 0 wt % and about 20 wt % binder. In this embodiment, the anode layer comprises between about 30 wt % and about 98 wt % anode active material, between about 0 wt % and about 50 wt % sulfide-based solid electrolyte, between about 0 wt % and about 30 wt % conductive additive, and between about 0 wt % and about 20 wt % binder. Moreover, the sulfide-based solid electrolyte may comprise at least one of a pseudobinary sulfide, a pseudoternary sulfide, and a pseudoquaternary sulfide.

In one embodiment, the pseudobinary sulfide may comprise one of $Li_3PS_4$, $Li_7P_3S_{11}$, $Li_4SnS_4$, and $80Li_2S.20P_2S_5$. In another embodiment, the pseudoternary sulfide may comprise one of $Li_{3.25}Ge_{0.25}P_{0.75}S_4$, $Li_6PS_5Br$, $Li_6PS_5I$, $Li_6PS_5Cl$, $Li_7P_2S_8I$, $Li_4PS_4I$, and $LiI—Li_4SnS_4$. In yet another embodiment, the pseudoquaternary sulfide may comprise one of $Li_{9.54}Si_{1.74}P_{1.44}S_{11.7}Cl_{0.3}$ and $Li_{10.35}[Sn_{0.27}Si_{1.08}]P_{1.65}S_{12}$.

Figure 8A:
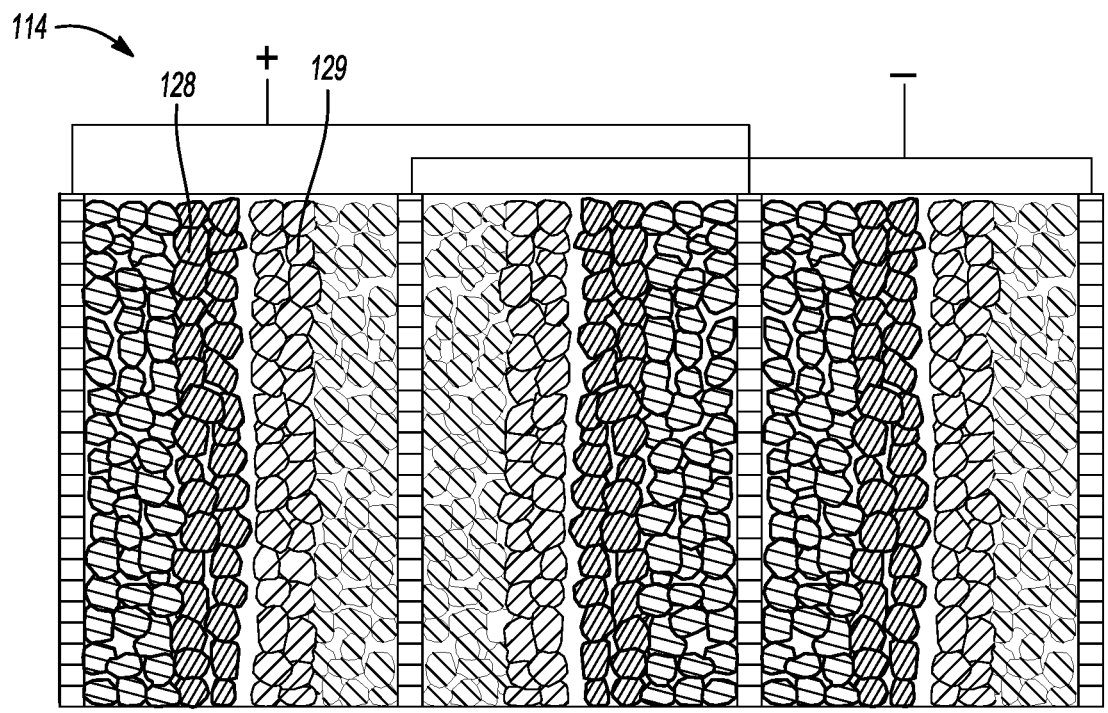
FIG. 8a is a cross-sectional view of a conceptual image of a sulfide-impregnated solid-state battery in accordance with another embodiment of the disclosure.

It should be understood that cell unit (same as the one in cell core 14 of FIG. 7a) may be also connected in series, namely, bipolar stacking. In a bipolar cell core, only the outermost current collectors in the cell core have tabs extending from their top sides. The outermost current collectors are indicated as either positively charged or negatively charged. The other current collector in the inner of cell core are simultaneously coated by both cathode and anode layer to form bipolar electrode. Furthermore, the cell core comprises a densified sulfide-based solid-state electrolyte dispersed in the pore structures of bipolar-stacked cell core. FIG. 8a illustrates sulfide-impregnated battery cell core 114 having similar components such as the sulfide-based solid electrolyte as in cell core 14 described above and depicted in FIG. 7a. As shown, each cell unit in cell core 114 comprises a first separator layer 128 that coated onto cathode layer and a second separator layer 129 that coated onto anode layer. In this embodiment, first and second separator layers 128, 129 are comprised of solid-state electrolytes particles with different chemical compositions. In one embodiment, the first coated separator layer 128 may comprise one of $Li_7La_3Zr_2O_{12}$ solid-state electrolyte, and the second coated separator layer 128 may comprise one of $Li_{1.4}Al_{0.4}Ti_{1.6}(PO_4)_3$ solid-state electrolyte. It should be understood that sulfide-impregnated solid-state batteries also have single separator layer designs and have similar components such as the sulfide-based solid electrolyte as in cell core 14 previously described and depicted in FIG. 7a. For example, each cell unit in sulfide-impregnated solid-state battery cell core only comprises a single separator layer that disposed between the positive and negative electrodes. The single separator layer could be the oxide-based solid electrolyte layer that coated onto either anode layer surface or cathode layer surface.

Figure 8B:
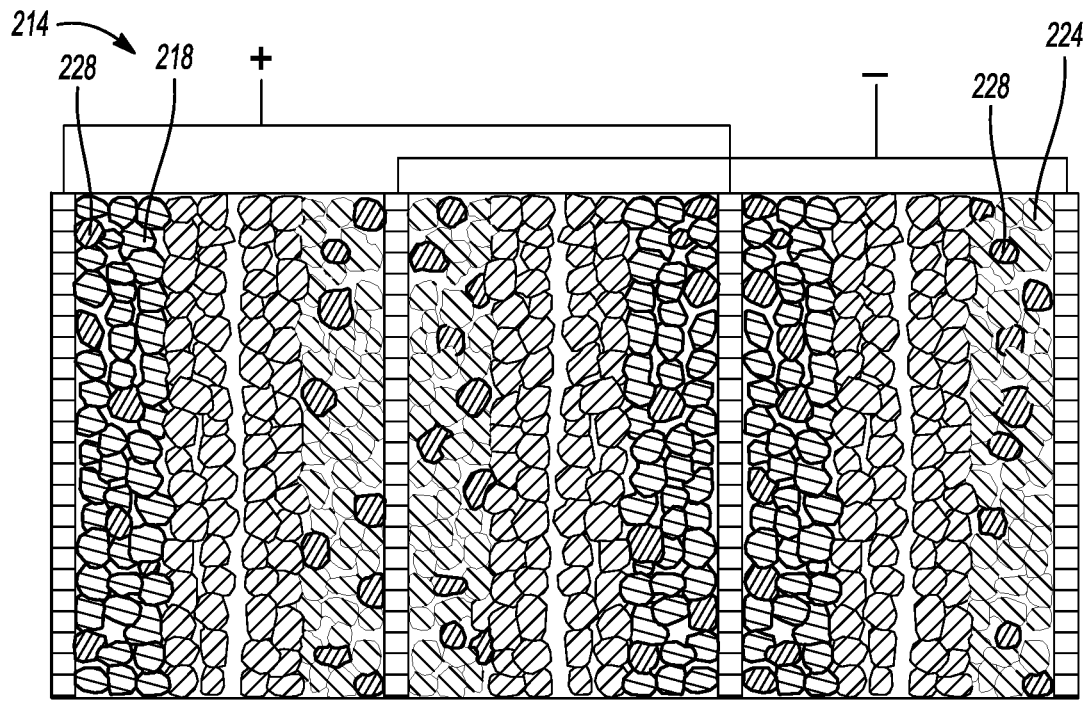
FIG. 8b is a cross-sectional view of a conceptual image of a sulfide-impregnated solid-state battery in accordance with yet another embodiment.

FIG. 8b depicts sulfide-impregnated battery cell core 214 comprising similar components such as the sulfide-based solid electrolyte as cell core 14 previously described and depicted in FIG. 7a. Moreover, in cell core 214, oxide-based solid-state electrolyte particles 228 are introduced into cathode layers 218 and anode layers 224 to create more lithium ion conduction pathways. The introduced oxide-based solid-state electrolyte particles 228 may comprise at least one of a typical oxide-based solid-state electrolyte, a metal-doped and aliovalent-substituted oxide-based solid-state electrolyte. For example, the introduced solid-state electrolyte particles 228 may comprise one of a $Li_7La_3Zr_2O_{12}$, an aluminum-doped $Li_7La_3Zr_2O_{12}$, Sb-doped $Li_7La_3Zr_2O_{12}$ Ga-substituted $Li_7La_3Zr_2O_{12}$, a Cr and V-substituted $LiSn_2P_3O_{12}$, and an Al-substituted perovskite. In another aspect, it is understood that solid-state electrolyte particles 228 may be only introduced into cathode layers 218 or anode layers 224 to create more lithium ion conduction pathways in cell core. The cathode layer may comprise between about 30 wt % and about 98 wt % cathode active material, between about 0 wt % and about 30 wt % oxide-based solid-state electrolyte, between about 0 wt % and about 50 wt % sulfide-based solid-state electrolyte, between about 0 wt % and about 30 wt % conductive additive, and between about 0 wt % and about 20 wt % binder. Moreover, the anode layer may comprise between about 30 wt % and about 98 wt % anode active material, between about 0 wt % and about 30 wt % oxide-based solid-state electrolyte, between about 0 wt % and about 50 wt % sulfide-based solid-state electrolyte, between about 0 wt % and about 30 wt % conductive additive, and between about 0 wt % and about 20 wt % binder.

Figure 8C:
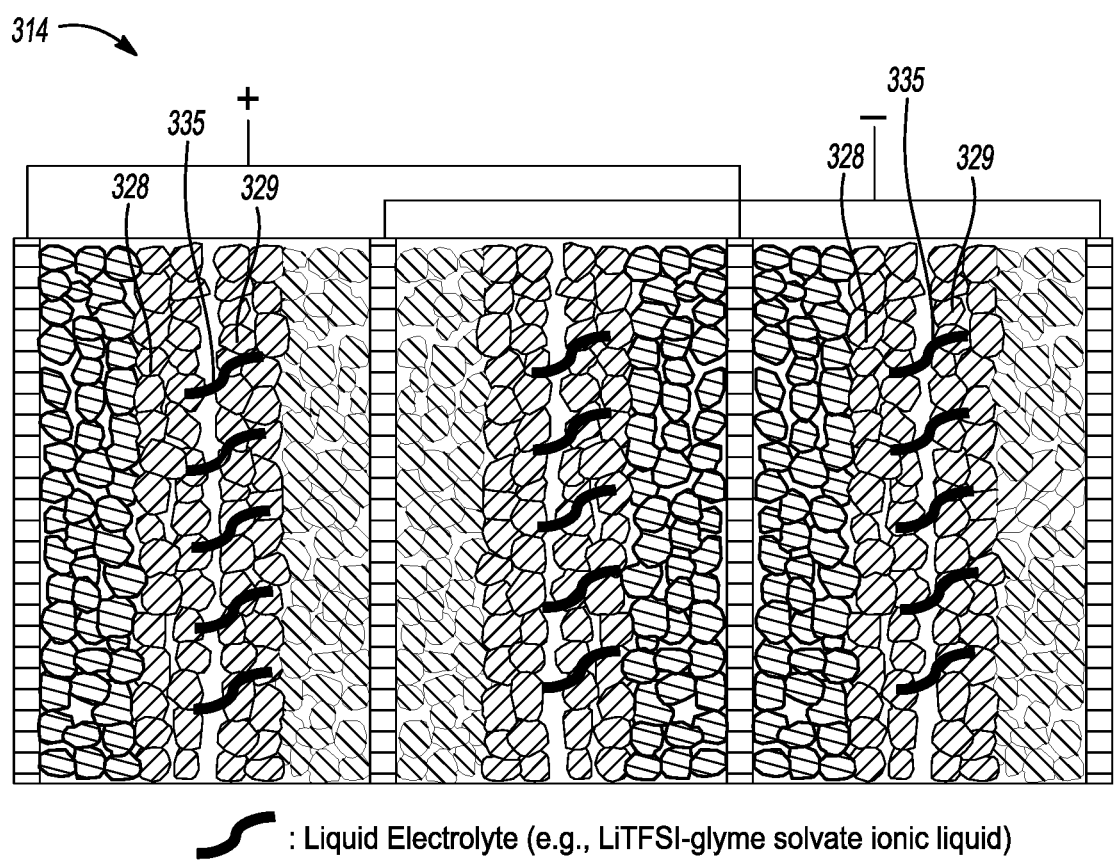
FIG. 8c is a cross-sectional view of a conceptual image of a sulfide-impregnated solid-state battery in accordance with still another embodiment.

FIG. 8c illustrates a cell core 314 having similar components such the sulfide-based solid electrolyte as in cell core 14 previously described and depicted in FIG. 7a. Additionally, cell core 314 further comprises a liquid electrolyte 335 disposed in the pore structures of cathode layer, anode layer, first coated separator layer 328 and second coated separator layer 329 for boosting cell performance. In this embodiment, the liquid electrolyte 335 may comprise an ionic liquid such as Li(triethylene glycol dimethyl ether)bis(trifluoromethanesulfonyl)imide (Li(G3)TFSI), and traditional carbonate-based electrolyte such as $LiPF_6$-EC/DEC with additives, and highly concentrated electrolytes such as LiTFSI in acetonitrile. Other Li-ion conduction liquid electrolyte may be used without departing from the spirit of the disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A sulfide-impregnated solid-state battery comprising:
a cell core constructed by cell units and having a pore structure, each cell unit comprising:
    a positive electrode comprising a cathode layer and a positive meshed current collector comprising a conductive material, wherein the cathode layer is further coated by an oxide-based solid electrolyte layer; and
    a negative electrode comprising an anode layer and a negative meshed current collector comprising a conductive material, wherein the anode layer is further coated by an oxide-based solid electrolyte layer,
    wherein the positive electrode and the negative electrode are stacked together to form the cell unit, and the two of the coated oxide-based solid-state electrolyte layers are disposed between the positive electrode and the negative electrode as dual separators,
    wherein the cathode layer comprises between about 30 wt % and about 98 wt % cathode active material, between about 0 wt % and about 50 wt % sulfide-based solid-state electrolyte, between about 0 wt % and about 30 wt % conductive additive, and between about 0 wt % and about 20 wt % binder,
    wherein the anode layer comprises between about 30 wt % and about 98 wt % anode active material, between about 0 wt % and about 50 wt % sulfide-based solid-state electrolyte, between about 0 wt % and about 30 wt % conductive additive, and between about 0 wt % and about 20 wt % binder, and
wherein a sulfide-base solid-state electrolyte is dispersed in the pore structure of the cell core.

2. The battery of claim 1 wherein each cell unit is connected in one of parallel arrangement and bipolar arrangement.

3. The battery of claim 1 wherein the cathode active material is selected from the group consisting of a high-voltage cathode material, a rock salt layered oxide, a spinel, a polyanion cathode, a lithium transition-metal oxide, and at least one of $LiNi_{0.5}Mn_{1.5}O_4$, $LiNbO_3$-coated $LiNi_{0.5}Mn_{1.5}O_4$, $LiCoO_2$, $LiNi_xMn_yCo_{1-x-y}O_2$, $LiNi_xMn_{1-x}O_2$, $Li_{1+x}MO_2$, $LiMn_2O_4$, $LiV_2(PO_4)_3$.

4. The battery of claim 1 wherein the anode active material is selected from the group consisting of a carbonaceous material, silicon, silicon-graphite mixture, $Li_4Ti_5O_{12}$, transition-metal, metal oxide, and sulfide.

5. The battery of claim 1 wherein each of the cathode layer and the anode layer has a thickness of between about 1 micrometer and about 1000 micrometers.

6. The battery of claim 1 wherein each of the positive meshed current collector and the negative meshed current collector has a thickness of between about 4 micrometers and about 200 micrometers and a pore size of between about 50 nm and 2000 um.

7. The battery of claim 1 wherein the positive meshed current collector and the negative meshed current collector is selected from the group consisting of aluminum, nickel, iron, titanium, copper, tin, and alloys thereof.

8. The battery of claim 1 wherein the positive meshed current collector and the negative meshed current collector includes flat foils of conductive material with no holes.

9. The battery of claim 1 wherein the oxide-based solid electrolyte layers disposed on the cathode layer and anode layer comprise an oxide-based solid-state electrolyte of $Li_3xLa_{2/3-x}TiO_3$, $Li_{1.4}Al_{0.4}Ti_{1.6}(PO_4)_3$ and $Li_{1+x}Al_xGe_{2-x}(PO_4)_3$, $Li_{2+2x}Zn_{1-x}GeO_4$, $Li_7La_3Zr_2O_{12}$ or mixtures thereof.

10. The battery of claim 1 wherein the oxide-based solid electrolyte layers disposed on the cathode layer and anode layer comprise at least one of a metal-doped and aliovalent-substituted oxide-based solid-state electrolyte, a borate and a phosphate solid-state electrolyte, and an oxide ceramic powder.

11. The battery of claim 1 wherein the oxide-based solid electrolyte layers disposed on the cathode layer and anode layer comprise same or different chemical compositions.

12. The battery of claim 1 wherein the oxide-based solid electrolyte layers disposed on the cathode layer and anode layer each have a thickness of between about 50 nanometers and about 1000 micrometers.

13. The battery of claim 1 wherein the sulfide-base solid-state electrolyte comprises at least one of a pseudobinary sulfide, a pseudoternary sulfide, and a pseudoquaternary sulfide,
    wherein the pseudobinary sulfide comprises one of $Li_3PS_4$, $Li_7P_3S_{11}$, $Li_4SnS_4$, and $80Li_2S.20P_2S_5$,
    wherein the pseudoternary sulfide comprises one of $Li_{3.25}Ge_{0.25}P_{0.75}S_4$, $Li_6PS_5Br$, $Li_6PS_5I$, $Li_6PS_5Cl$, $Li_7P_2S_8I$, $Li_4PS_4I$, and $LiI-Li_4SnS_4$, and
    wherein the pseudoquaternary sulfide comprises one of $Li_{9.54}Si_{1.74}P_{1.44}S_{11.7}Cl_{0.3}$ and $Li_{10.35}[Sn_{0.27}Si_{1.08}]P_{1.65}S_{12}$.

14. The battery of claim 1 wherein the cell core further includes a liquid electrolyte selected from the group consisting of Li(triethylene glycol dimethyl ether)bis(trifluoromethanesulfonyl)imide (Li($G_3$)TFSI), LiPF6-EC/DEC with additives, and LiTFSI in acetonitrile.

* * * * *